R. C. HOWARD.
Wheel-Cultivator.
No. 59,022. Patented Oct. 23, 1866.
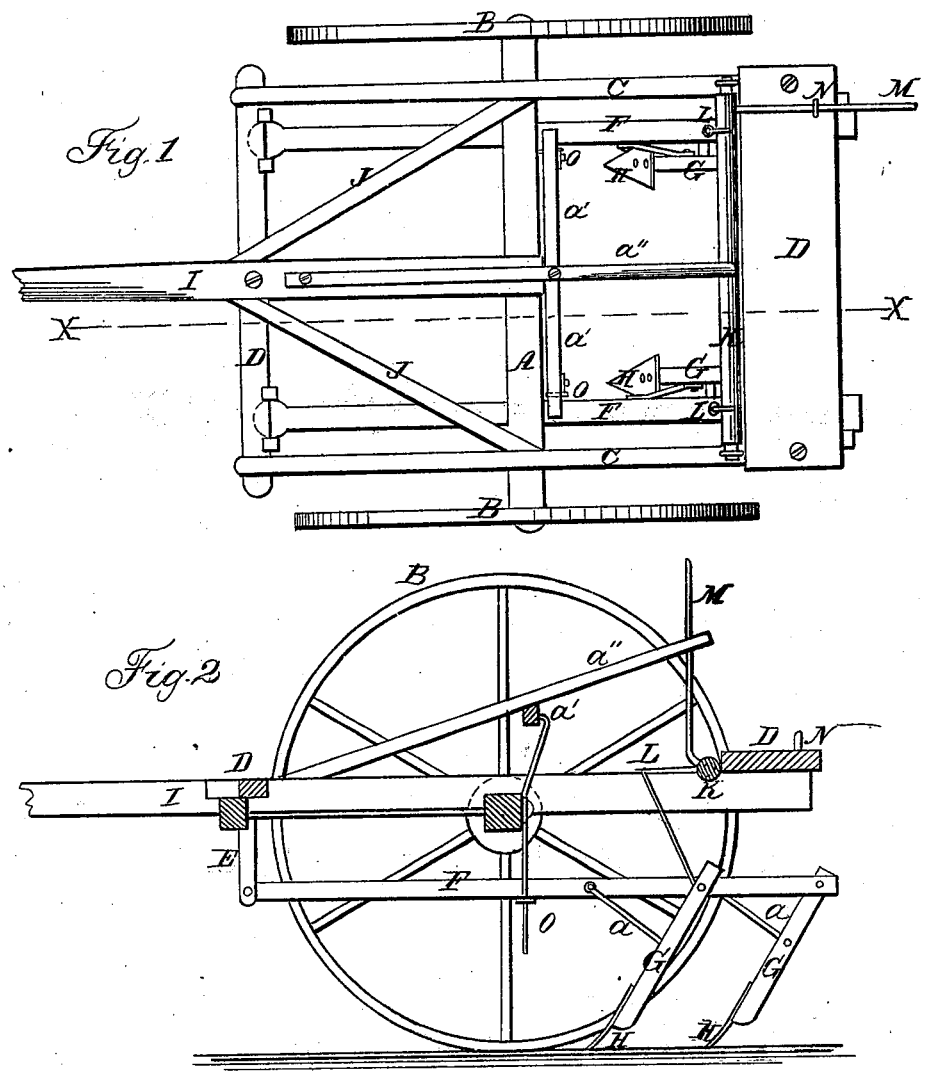

UNITED STATES PATENT OFFICE.

R. C. HOWARD, OF LENA, ILLINOIS.

IMPROVEMENT IN CORN-PLOWS.

Specification forming part of Letters Patent No. 59,022, dated October 23, 1866.

*To all whom it may concern:*

Be it known that I, RICHARD C. HOWARD, of Lena, in the county of Stephenson and State of Illinois, have invented a new and Improved Corn-Plow; and I do hereby declare that the following is a full, clear, and exact description thereof, reference being had to the accompanying drawings, forming part of this specification.

The nature of my invention relates to an improvement in corn-plows, which consists in providing a rock-shaft provided with levers, to which cords are attached, by which, through the medium of a lever, the driver is able to throw the plows out of the ground, and the weight be brought upon the wheels, so that it can be drawn from place to place without the plows coming in contact with the ground.

To enable others skilled in the art to make and use my invention, I will proceed to describe its construction and operation.

Figure 1 is a top-plan view of my improved corn-plow. Fig. 2 is a transverse sectional elevation from the line $x\ x$.

Letters of like name and kind refer to like parts in each of the figures.

B B are two wheels, which run on an axle, A. C C are two bars running at right angles across the axle and rigidly secured thereto. At each end of these bars C C are cross-pieces D D secured, which support and give strength to the frame or bars C C.

At the front piece are pendants E E, which extend down, to which are connected by a joint the plow-beams F F. At the rear end of these beams are the standards G G, to which the plowshares H H are attached. These standards G G are strengthened by the braces $a\ a$, which run from the said standards to the beams F.

I is the pole which is secured to the front cross-piece and axle A, and to which the team is attached when operated. J J are braces, which support and add strength to the tongue or pole when subjected to any lateral strain. K is a rock-shaft hung in bearings on the pieces C C. To this rock-shaft are attached pendent levers L L, at the end of which are attached cords or chains that connect to the plow-beams F F. To this rock-shaft K is also attached another lever, M, for the convenience of the operator for elevating and lowering the plows.

When it is desired to elevate the plows, the lever M is turned back and the end of the lever caught under the hook N, which holds the plows in an elevated position, when it may be drawn from place to place.

O O are guide-rods for the plow-beams as they are elevated and lowered, to prevent them from swinging or having any lateral motion. These rods are bent or turned near their center into an eye, through which a screw passes into the axle, and which acts as a bearing for the rods in turning the beams I laterally. The upper ends are secured to the cross-piece $a'$, attached to the lever $a''$, and the lower ends pass through eyes or brackets on the inner side of the beams F and guide these beams in their ascent or descent, and also act as arms from the lever in pushing or turning the beams laterally.

Having thus described my invention, what I claim as new, and desire to secure by Letters Patent, is—

The guide-rods O, in combination with the lever $a''$ and beams F, substantially as described, for the purpose specified.

RICHARD C. HOWARD.

Witnesses:
 CALEB GODDARD,
 ALFONSO HOWARD.